United States Patent
Komada

(10) Patent No.: US 7,133,147 B2
(45) Date of Patent: Nov. 7, 2006

(54) IMAGE-PROCESSING APPARATUS EQUIPPED WITH RECORDING-MATERIAL MANUAL-FEEDING MECHANISM AND CONTROL METHOD FOR THE APPARATUS

(75) Inventor: Yasuo Komada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 09/859,481

(22) Filed: May 18, 2001

(65) Prior Publication Data

US 2001/0030765 A1 Oct. 18, 2001

Related U.S. Application Data

(62) Division of application No. 08/662,125, filed on Jun. 12, 1996.

(30) Foreign Application Priority Data

Jun. 22, 1995 (JP) .............................. 1995-156133

(51) Int. Cl.
*G05F 15/00* (2006.01)

(52) U.S. Cl. ............... 358/1.15; 358/1.13; 358/1.12; 358/1.16

(58) Field of Classification Search .............. 358/1.2, 358/1.12, 1.13, 1.14, 1.15, 1.16, 1.1, 1.5, 358/1.11, 401, 496, 498; 347/139
See application file for complete search history.

(56) References Cited

U.S. PATENT DOCUMENTS

| | | | | |
|---|---|---|---|---|
| 4,383,756 A | | 5/1983 | Hanamoto et al. ..... | 355/14 CU |
| 4,649,403 A | * | 3/1987 | Miura ..................... | 347/139 |
| 4,734,760 A | * | 3/1988 | Futaki .................... | 358/474 |
| 4,814,893 A | | 3/1989 | Katoh .................... | 358/296 |
| 4,825,405 A | * | 4/1989 | Makino et al. .......... | 364/900 |
| 5,008,715 A | | 4/1991 | Imaizumi et al. ....... | 355/313 |
| 5,019,916 A | * | 5/1991 | Ogura ................... | 358/401 |
| 5,258,779 A | | 11/1993 | Serizawa et al. ........ | 346/134 |
| 5,321,486 A | | 6/1994 | Nanbu et al. ........... | 355/311 |
| 5,448,346 A | | 9/1995 | Tabata .................... | 355/311 |
| 5,513,013 A | | 4/1996 | Kuo ...................... | 358/448 |
| 5,610,728 A | | 3/1997 | Sobue .................... | 358/449 |
| 5,678,124 A | | 10/1997 | Tokura .................. | 399/26 |

FOREIGN PATENT DOCUMENTS

| | | |
|---|---|---|
| JP | 1-203130 | 8/1989 |
| JP | 5-162871 | 6/1993 |
| JP | 6-100210 | 4/1994 |

* cited by examiner

*Primary Examiner*—Mark Wallerson
(74) *Attorney, Agent, or Firm*—Fitzpatrick, Cella, Harper & Scinto

(57) ABSTRACT

An image-processing apparatus and a control method for this apparatus. Image data is received through a communication section and is recorded by a recording section onto a recording material fed from a manual-feeding tray. Recording materials of various sizes can be set on this tray. The correct recording-material size is obtained based on the size of the received image data and is displayed, and an indication is also given to check whether the recording operation is to be performed. If the manual-feeding operation has been selected, an alarm sound indicates that the image data has been received. The processing then proceeds according to the instruction given in response to the display. Further, if it is determined that a recording error has occurred when the recording operation is performed through manual feeding, the image data is stored in a non-volatile storage.

11 Claims, 12 Drawing Sheets

| FIG. 6A |
|---------|
| FIG. 6B |

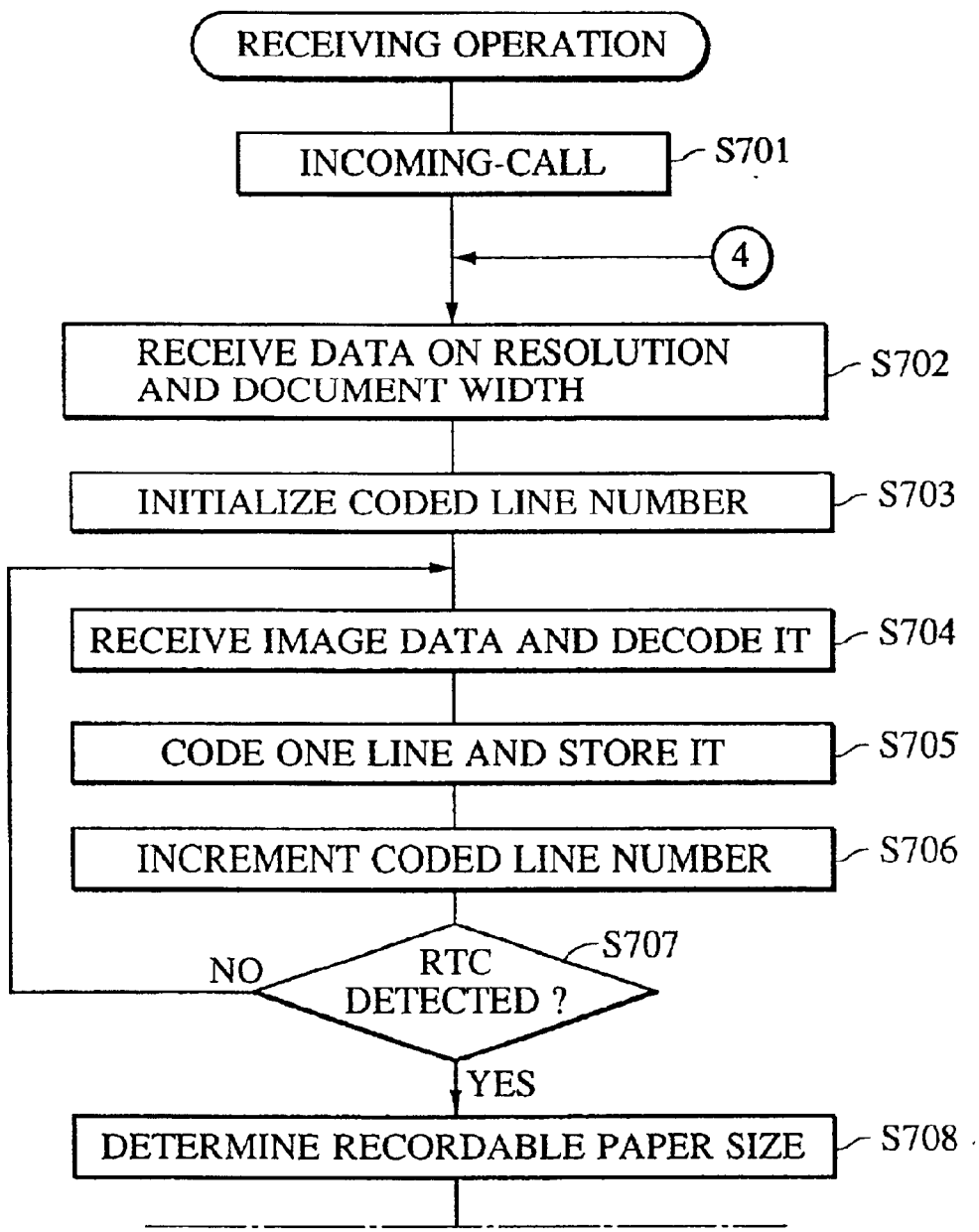

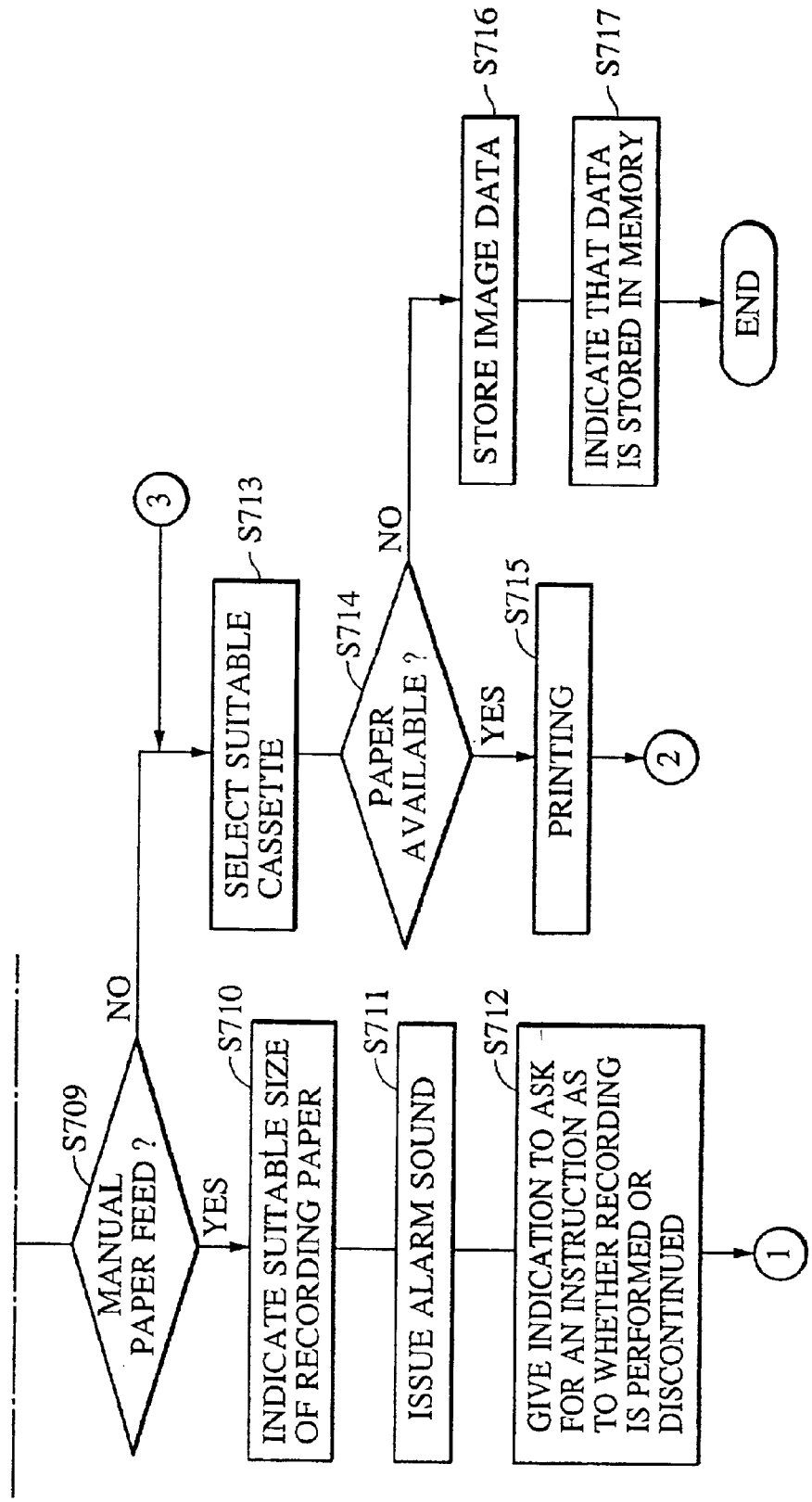

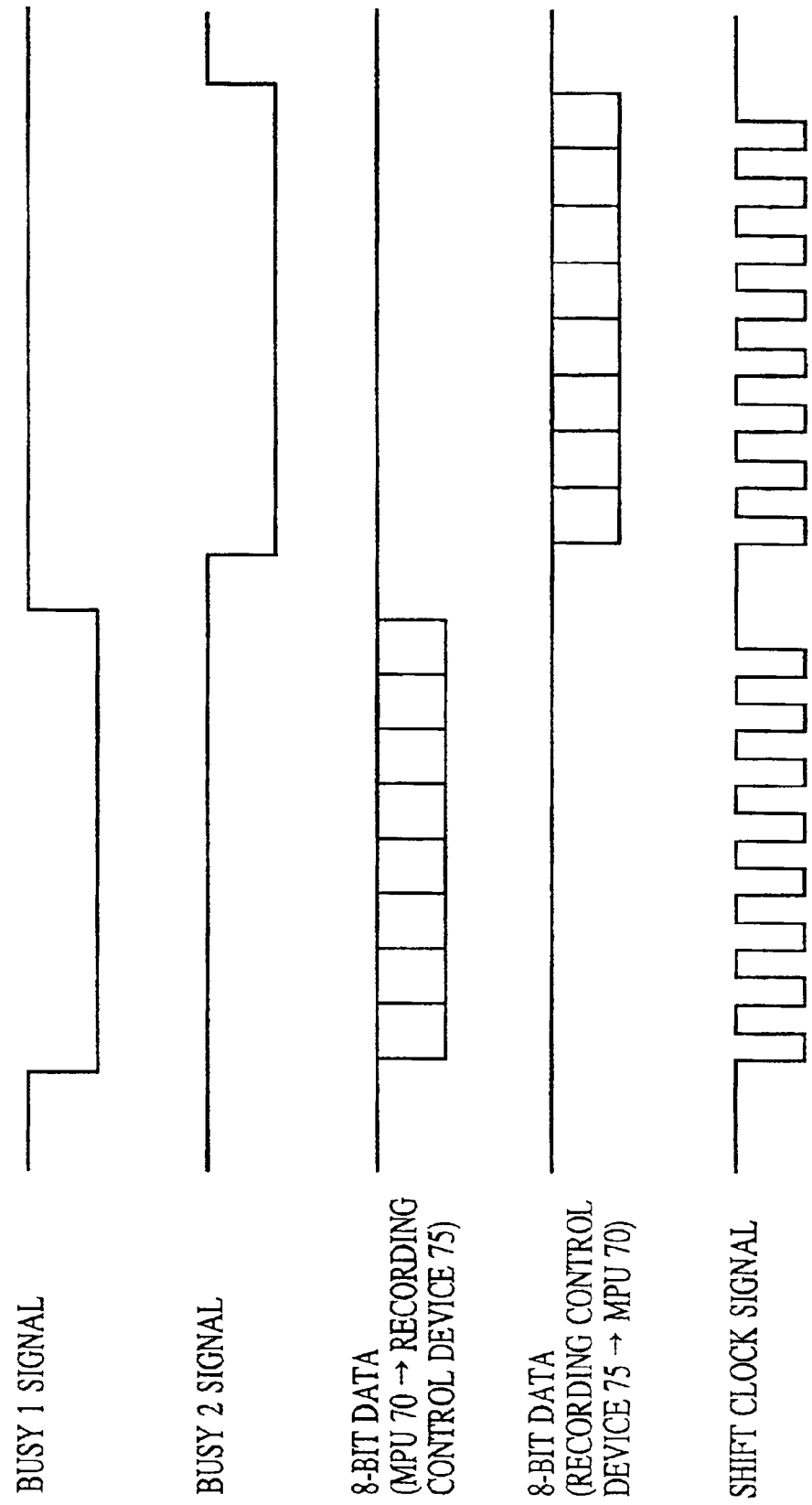

IMAGE-PROCESSING APPARATUS EQUIPPED WITH RECORDING-MATERIAL MANUAL-FEEDING MECHANISM AND CONTROL METHOD FOR THE APPARATUS

This is a divisional application of U.S. patent application Ser. No. 08/662,125, filed on Jun. 12, 1996, and allowed on May 7, 2001.

BACKGROUND OF THE INVENTION

1. Field of the Invention

The present invention relates generally to an image-processing apparatus for processing image data and also to a control method for the apparatus. More particularly, the invention relates to an image-processing apparatus that is capable of recording on manually fed recording sheets and also to a control method for the apparatus.

2. Description of the Related Art

Hitherto, the following technique is known for recording apparatuses that are capable of recording images obtained through facsimile communication, computer output, document copying, and so on. Namely, as recording-material feeding means, in addition to cassettes for accommodating and feeding recording materials of predetermined sizes, a manual-feeding tray is provided to enable recording onto a recording material which cannot be fit into the cassettes. More specifically, if the recording materials that can be set in the cassettes are limited to A4, letter, and legal sizes, and if it is desired that an image be recorded on recording materials of specific sizes other than the above predetermined sizes, such as B5, postcards, envelopes, overhead projector (OHP) sheets, etc., such recording materials differing from standard sizes are set on the manual-feeding tray. Although recording materials of a variety of sizes can be set on the manual-feeding tray, a large number of mechanical and electrical parts are required for automatically detecting the sizes of the recording materials, which can lead to an increase in costs. Accordingly, in most cases, the automatic detection of the different sizes is not performed on recording materials set on the manual-feeding tray. This means that any recording operation which is started will inevitably and unconditionally be done on recording materials of whatever size is set on the tray.

The conventional apparatuses of the above type present the following problems. The recording operation is unconditionally performed on a recording material fed from the manual-feeding tray regardless of the size of the input image data. This may cause a recording error; for example, if a recording material is set on the tray for the purpose of processing other than the recording operation, the image may not fit onto the recording material, since the size of the image may be larger than that of the recording material.

Also, even if the size of a recording material set on the manual-feeding tray is detected, the following problem is yet encountered. Namely, problems can arise if, when the size of the image data fits the size of the recording material set on the tray, the recording operation is unconditionally performed on the recording material. For example, if an OHP sheet is set on the tray, an image will be disadvantageously recorded on the OHP sheet even though this is not desired. Additionally, an occurrence of a recording error requires the troublesome operation of inputting the image data once again.

SUMMARY OF THE INVENTION

Accordingly, it is an object of the present invention to provide an image-processing apparatus that can solve the above-described problems, and to provide a control method for this apparatus.

It is another object of the present invention to provide an improvement in the recording operation of images onto recording materials other than recording materials set in cassettes.

It is still another object of the present invention to provide an improvement in efficiently handling the operation of recording images onto recording materials through manual feeding.

It is yet another object of the present invention to provide an improvement in the avoidance of unintentionally recording images onto manually-fed recording material.

In order to achieve the above objects, according to one aspect of a preferred embodiment of the present invention, an image-processing apparatus includes receiving means for receiving image data and recording means for recording the image data received by the receiving means onto recording material. Manual-feeding means is provided for receiving and feeding manually-loaded recording material of various size. Inquiry means is provided for, before the recording means records the image data, making an inquiry of an operator of the image processing apparatus and receiving an instruction as to whether the recording means is to record the image data on the recording material fed by the manual-feeding means. Control means causes the recording means to record the image data on the recording material fed by the manual-feeding means when an instruction to record is given in response to the inquiry made by the inquiry means.

According to another aspect of the present invention, an image-processing apparatus includes input means for inputting image data and size-detection means for detecting a size of the image data input by the input means. Manual-feeding means receives and feeds manually-loaded recording material of various size. Determining means is provided for determining, based on the size of the image data detected by the size-detection means, a recording-material size appropriate for recording the image data input by the input means. Display means displays, when feeding is to be performed by the manual-feeding means, the recording-material size determined by the determining means.

According to a further aspect of the present invention, an image-processing apparatus includes input means for inputting image data and storage means for storing the image data input by the input means. Manual-feeding means is provided for receiving and feeding manually-loaded recording material of various size, recording means is provided for recording the image data input by the input means onto the recording material fed by the manual-feeding means. Determining means determines whether the image data input by the input means has been fit by the recording means onto the recording material. Control means is provided for discontinuing storage of the image data by the storage means when it is determined by the determining means that the image data has been fit onto the recording material, and for continuing storage of the image data by the storage means when it is determined by the determining means that the image data has not been fit onto the recording material.

According to an aspect of another preferred embodiment of the present invention, a control method for an image-processing apparatus includes the steps of: (a) receiving image data; (b) making an inquiry to an operator of the image-processing apparatus as to whether an image based on the image data received in step (a) is to be recorded; and (c) recording the image based on the image data received in step (a) onto manually-loaded recording material fed by a manual-feeding mechanism for use with the image-processing apparatus when an instruction to record is given in response to the inquiry made in step (b).

According to another aspect of the present invention, a control method for an image-processing apparatus, includes the steps of: (a) inputting image data; (b) detecting a size of the image data input in step (a); (c) determining a recording-material size appropriate for recording the image data input in step (a) based on the size of the image data detected in step (b); and (d) displaying the recording-material size determined in step (c) before the start of recording when the recording is to be done on recording material fed by a manual-feeding mechanism for use with the image-processing apparatus.

According to yet another aspect of the present invention, a control method for an image-processing apparatus, includes the steps of: (a) inputting image data; (b) storing the image data input in step (a); (c) recording the image data input in step (a) onto recording material fed by a manual-feeding mechanism for use with the image-processing apparatus; (d) determining whether the image data has been correctly recorded on the recording material; (e) erasing the image data stored in step (b) when it is determined in step (d) that the image data has been correctly recorded; and (f) holding the image data stored in step (b) when it is determined in step (d) that the image data has not been correctly recorded.

Further objects, features and advantages of the present invention will become apparent from the following description of the preferred embodiments with reference to the attached drawings.

BRIEF DESCRIPTION OF THE DRAWINGS

FIG. 7 is a flow chart illustrating the process of the receiving operation;

FIG. 10 is a time chart illustrating the serial transmission of the data indicating the recordable size of a recording material from an MPU to a recording control device.

DETAILED DESCRIPTION OF THE PREFERRED EMBODIMENT

An embodiment of the present invention will now be described in detail with reference to the drawings.

Figure 1:
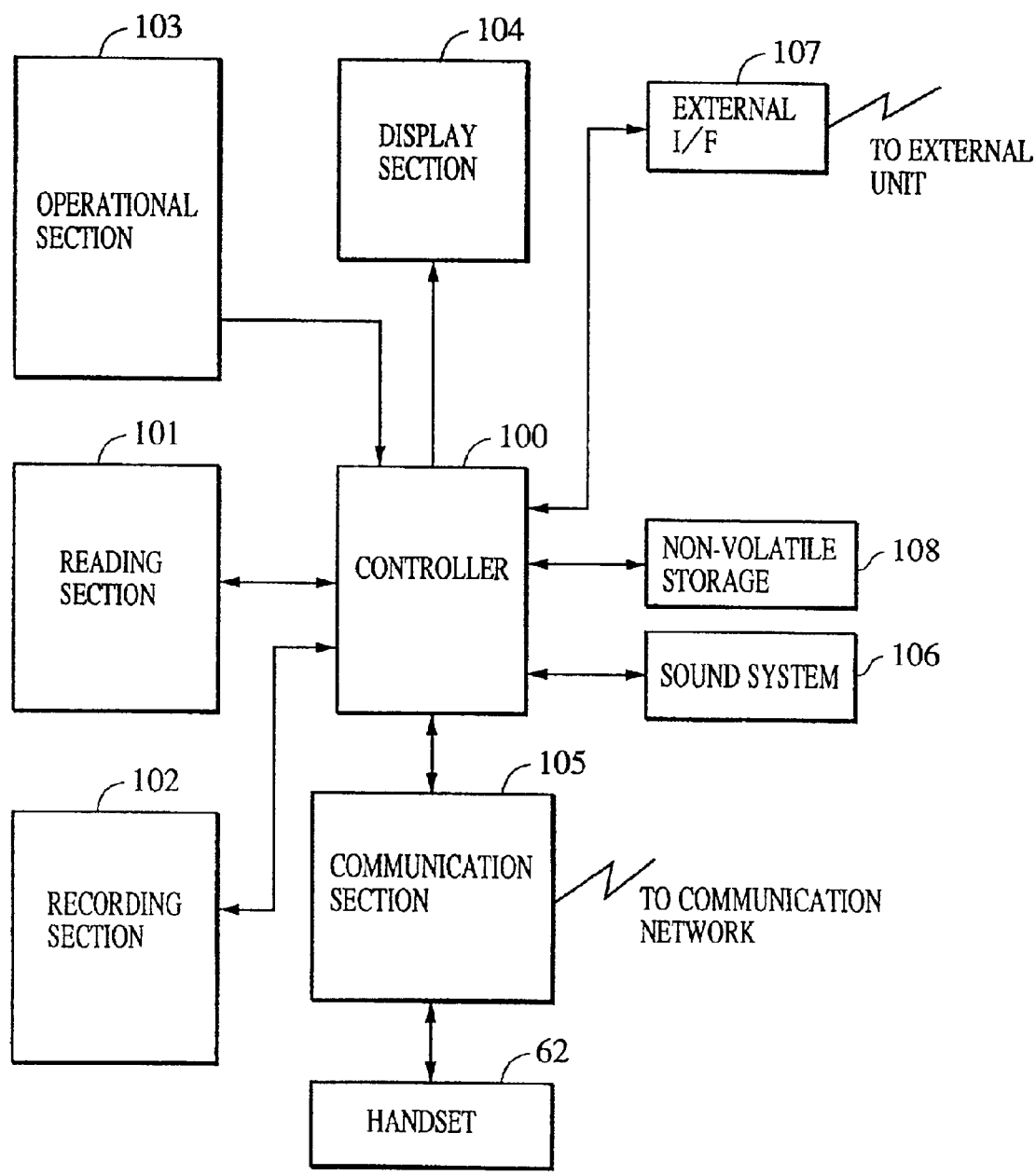
FIG. 1 is a block diagram of the schematic configuration of a facsimile machine according to an embodiment of the present invention.
Figure 2A:
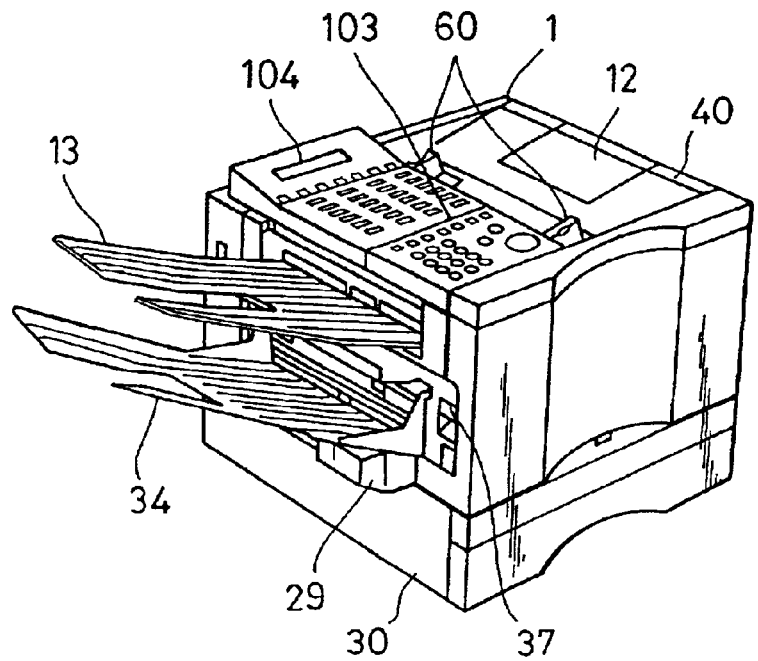
FIGS. 2(a) and 2(b) are external views of the facsimile machine.
Figure 2B:
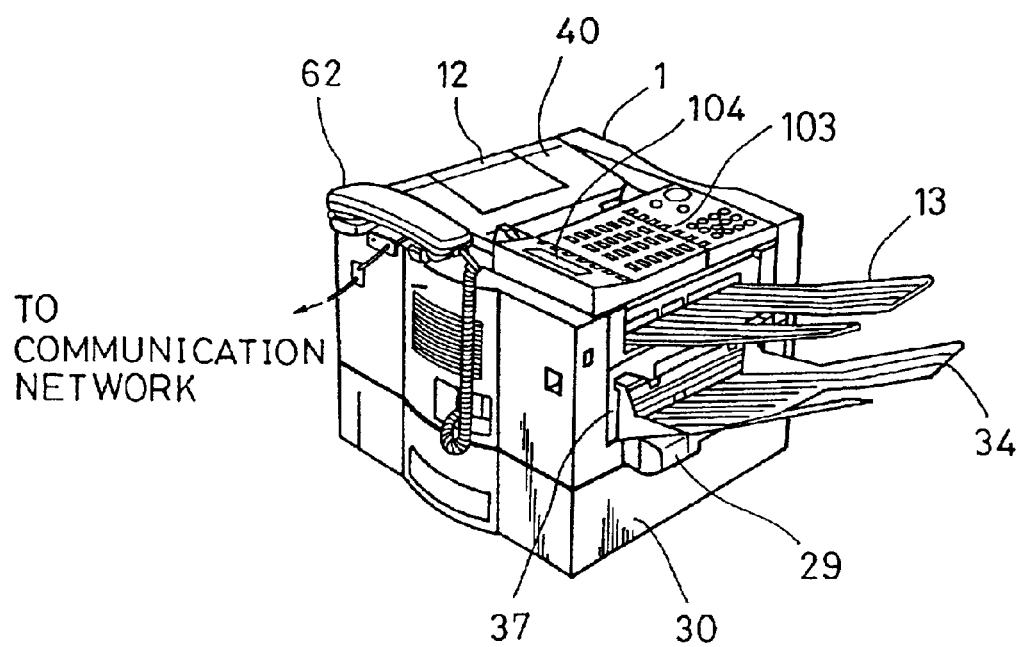
Figure 3:
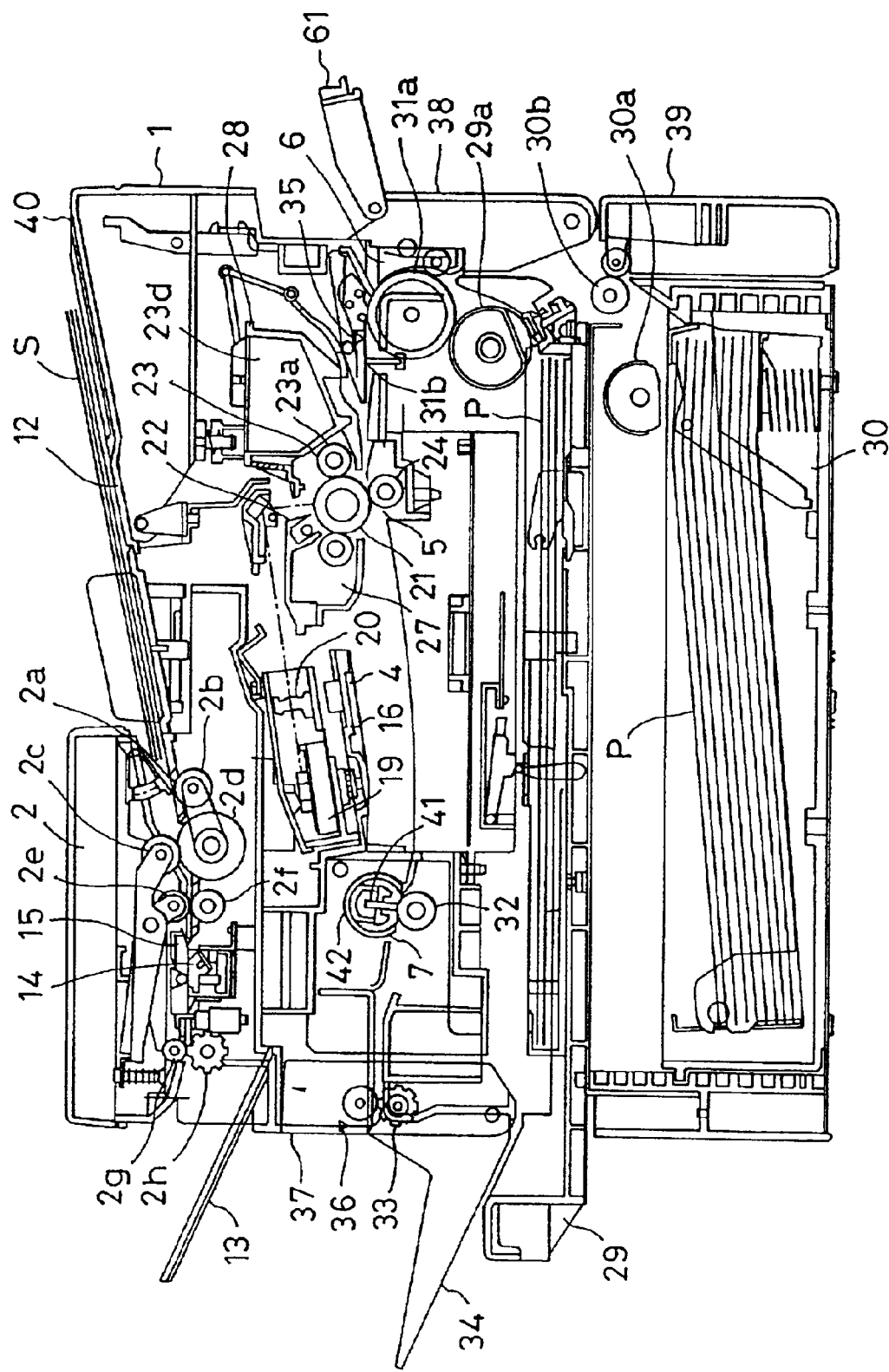
FIG. 3 is a sectional view of the facsimile machine.

FIG. 1 is a block diagram of the schematic construction of a facsimile machine according to an embodiment of the present invention. FIGS. 2(a) and 2(b) are external views of the facsimile machine. FIG. 3 is a sectional view of the facsimile machine. The construction of the facsimile machine of this embodiment will now be explained with reference to FIGS. 1 to 3. Like reference numerals represent like elements. The main unit of a facsimile machine generally designated by 1 includes a controller 100, a reading section 101, a recording section 102, an operational section 103, a display section 104, a communication section 105, a sound system 106, an external interface (I/F) 107, non-volatile storage 108, and a handset 62. The reading section 101 reads an image formed on a document and supplies image data captured in the reading section 101 to the controller 100.

In a document feeder 2, a slider 60 is first adjusted to match the width of a plurality of documents S. The documents S are placed on a document placing table 12, and then, a document detection sensor detects that the documents S have been placed on the table 12 and also detects the width of the documents S. A reading instruction is given from the operational section 103 to drive a reading motor M1 (not shown) so that the documents S placed on the table 12 with their surfaces having image information downward are separated one by one by a preliminary feed roller 2b pressing against a preliminary feed pressing strip 2a and a separation roller 2d pressing against a separation pressing strip 2c. Starting from the leading page, the documents S are continuously fed to a contact image sensor 14 through the use of a feed roller 2f pressing against a feed roller 2e. More specifically, the image sensor 14 applies light using a light emitting diode (LED) array as a light source to the image information surface of the document S that is fed while being held by a document hold plate 15, and the reflected light from the document S is formed into an image on a sensor device through a SELFOC lens. In this manner, the image information formed on the document S can be read. The image information read by the sensor device undergoes various types of processing, such as shading corrections, analog-digital (A/D) conversion, binary processing, smoothing, etc. Thereafter, the information is sent to an optical section 4 or the communication section 105 in which a recording operation or a transmitting operation is performed. Meanwhile, the documents S with the image information has been read are discharged to a document discharge tray 13 through a discharge roller 2g and a discharge roller 2h.

The recording section 102 drives a recording motor (not shown) or the like to print the image information that has undergone processing, and is supplied from the controller 100, onto a recording material through the use of the optical section 4 and an image forming section 5, under control of a control device (discussed later) for controlling a laser scanner and an electrophotographic process.

Figure 4:
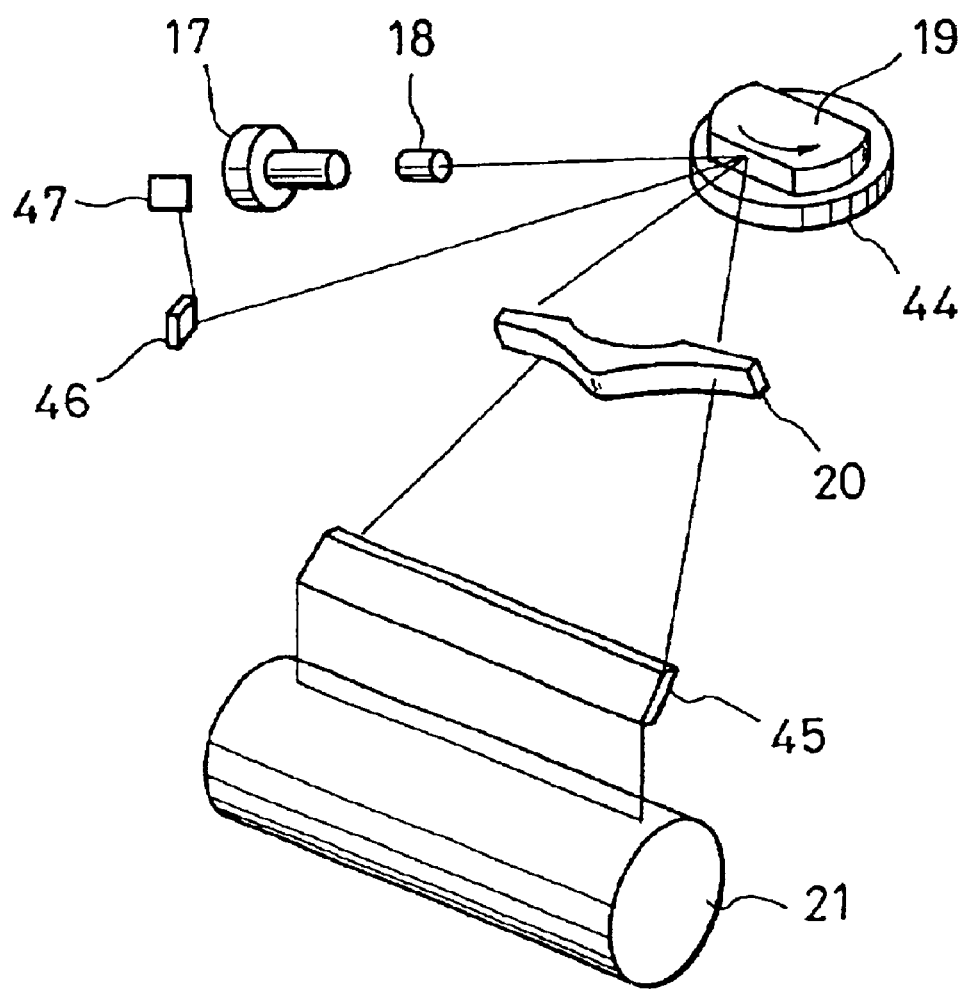
FIG. 4 illustrates the schematic configuration of an optical section for use in the facsimile machine.

FIG. 4 is a schematic view of the optical section 4. In the optical section 4, a laser diode 17 for use in a laser scanner 16 is caused to emit light according to an image signal sent from the controller 100 so as to generate a modulated laser beam. The laser beam is converted to a collimated beam through a collimator lens 18 and is then applied to a polygon mirror 19 rotating at a constant velocity by the operation of a polygon motor 44. The laser beam reflected from the polygon mirror 19 is focused on a photosensitive drum 21 through a lens 45 by an image-forming lens 20 placed in front of the polygon mirror 19. The polygon mirror 19 is rotated at a constant velocity so as to cause the laser beam to scan on the photosensitive drum 21 at a constant velocity. Because of this operation, an electrostatic latent image is formed on the photosensitive drum 21 according to the image signal. A fixed mirror 46 is located in the optical path of the laser beam, whereby the laser beam reaching the scanning start position is reflected by the mirror 46 and is incident on a photoreceiving device 47. The incident light is converted to a current by the photoreceiving device 47 and is further converted to a voltage which is then used for generating a horizontal synchronizing signal (beam detection signal).

In the image forming section 5, disposed around the photosensitive drum 21 (formed of a conductive drum and a photoconductive layer) are a primary charger 22, a developer unit 23, a charger 24 used for a transfer operation, a blade-type cleaner unit 25, and a discharger 26. The photosensitive drum 21, the primary charger 22, the developer unit 23, the cleaner unit 25 and the discharger 26, together with a developer recovering container 27, integrally constitute a process cartridge 28 detachably attached to a mounting member of the apparatus unit 1. The photosensitive drum 21, the primary charger 22, a developer sleeve 23a contained in the developer unit 23, and the transfer charger 24 are driven by a motor M2 (not shown). The photosensitive drum 21 driven by the motor M2 is directly and uniformly charged negatively on the overall surface while rotating past the primary charger 22, and is then exposed to a laser beam corresponding to the image signal received from the laser diode 17. By the application of the laser beam, negative charges on the photosensitive drum 21 corresponding to the bright portion of the image are neutralized, thereby forming an electrostatic latent image. When the latent image is placed in proximity to a developer T (not shown) in the developer unit 23, the negatively-charged developer T is attached to the surface of the photosensitive drum 21 due to a potential difference between the latent image and the developer unit 23, whereby the latent image is visualized. The photosensitive drum 21 is further positively charged by the transfer charger 24 so as to transfer the toner image formed on the photosensitive drum 21 onto a sheet-like recording material P. After the photosensitive drum 21 has its surface cleaned by the cleaner unit 25 to remove the residual toner, the potential of the drum 21 is made uniform by the primary charger 22, whereby the drum 21 is ready for the formation of a subsequent latent image. The residual toner removed from the surface of the drum 21 is recovered in the developer recovering unit 27.

In a recording-material feed section 6, a first cassette 29 and a second cassette 30 that are capable of accommodating a plurality of recording materials are attached to predetermined portions of the apparatus unit 1 in such a manner that they can be pulled out of the unit 1. Also, a manual-feeding tray 61 is attached to a predetermined portion of the apparatus unit 1. Upon detection of the presence of the recording materials P by a sensor, the recording materials P set in the first cassette 29 and the second cassette 30 are selectively fed. The manual-feeding tray 61 can be opened and closed. When the tray 61 is opened, recording materials are not fed from the first and second cassettes 29 and 30, and accordingly, priority is given to the recording material P placed on the manual-feeding tray 61 to be fed over the recording materials set in the cassettes 29 and 30. Therefore, the tray 61 can be opened to select the manual feeding operation. A guide (not shown), provided for the manual-feeding tray 61, is adjusted to the width of the recording material so as to detect it. The tray 61 may further be extended in a sliding manner so that a large-sized recording material can be placed.

The operation of feeding the recording materials P set in the first cassette 29 will now be explained. A recording-material feeding solenoid SL1 (not shown) is driven to transmit the driving force of the motor M2 to a semicircular recording-material feeding roller 29a which is then rotated, thereby separating the recording materials P one by one. The separated recording materials P are then fed by a feeding roller 31a. The forward end of the recording material P is detected as it passes a range sensor 31b, so that the feeding is timed in such a manner that the forward end of the toner image formed on the photosensitive drum 21 can be matched to the forward end of the recording material P. The recording material P is then fed between the photosensitive drum 21 and the transfer charger 24 by the feeding roller 31a.

An explanation will now be given of the operation of feeding the recording materials P set in the second cassette 30. A recording-material feeding solenoid SL2 (not shown) is driven to transmit the driving force of the motor M2 to a semicircular recording-material feed roller 30a which is then rotated, thereby separating the recording materials P one by one. The recording materials P are then fed to the feeding roller 31a by a cassette feeding roller 30b, and are further fed by the feeding roller 31a. At this time, the forward end of the recording material P is detected as it passes the range sensor 31b, so that feeding is timed in such a manner that the forward end of the toner image formed on the photosensitive drum 21 can be matched to the forward end of the recording material P. The recording material P is then fed between the photosensitive drum 21 and the transfer charger 24 by the feeding roller 31a.

The operation of feeding the recording materials P placed on the manual-feeding tray 61 will now be described. The driving force of the motor M2 is transmitted to the feeding roller 31a so as to rotate it, whereby the recording materials P set in the tray 61 are directly separated one by one. The recording materials P are further fed by the feeding roller 31a. At this time, the forward end of the recording material P is detected as it passes the sensor 31b, so that the feeding is timed in such a manner that the forward end of the toner image formed on the photosensitive drum 21 can be matched to the forward end of the recording material P. The recording material P is then fed between the photosensitive drum 21 and the transfer charger 24 by the feeding roller 31a.

The recording material P with an image transferred thereon in the image forming section 5 is further fed by a fixing roller 32 and a recording-material discharge roller 33 driven by the motor M2 and is discharged on a recording-material discharge tray 34. A recording-material feeding sensor 35 and a recording-material discharge sensor 36 are provided for the feed section and the discharge section, respectively, so as to detect whether the recording material P has arrived and passed through. If a recording material has not arrived or passed through each sensor within a predetermined period, the controller 100 determines that the recording material P has been erroneously fed and then outputs information to cause the display section 104 to indicate that the erroneous operation has occurred. Attached to the apparatus unit 1 are first, second and third covers 37, 38 and 39, and an upper cover 40 in such a manner that they can be opened and closed. The first cover 37 can be opened to remove jammed recording materials in the discharge section, while the second and third covers 38 and 39 can be opened to remove jammed recording materials in the feeding section. The upper cover 40 can be opened for eliminating jammed recording materials in the process cartridge 28 and also for loading and unloading the cartridge 28.

An image-fixing section 7 is comprised of a heater 41, a fixing film 42, the pressure-fixing roller 32, the discharge roller 33, and so on. Changes in the surface temperature of the heater 41 are detected by virtue of a change in the resistance of a thermistor that is in intimate contact with the heater 41. The surface temperature can be controlled so that it remains constant. The fixing film 42 is heated by the heater 41. The heating amount of the heater 41 is small so that a predetermined fixing temperature can be reached before the recording material P arrives at the fixing unit. When the recording material P with a toner image transferred thereon in the image-forming section 5 is separated from the photosensitive drum 21 and inserted into a nip formed between the heater 41 and the pressure-fixing roller 32, the roller 32 presses the toner on the recording material P against the heater 41 through the fixing film 42. The toner is thus softened and melted due to the heat conducted from the heater 41 so as to be fixed on the recording material P. The recording material P with the toner image fixed thereon is then discharged onto the discharge tray 34.

The operational section 103, which is comprised of a plurality of key-input switches and circuits for detecting key inputs, provides a means for inputting instructions regarding the operation of the facsimile machine 1 and various other types of information. More specifically, the operational section 103 is comprised of various types of key switches, such as a ten-key numerical pad for dialing and data registering and setting, function keys for various functions, single-button keys for "speed-dialing" registered telephone numbers, etc. with a single touch, start keys for starting transmitting, receiving and copying operations, stop keys for stopping transmitting, registering and setting operations, and so on.

The display section 104 displays the statuses of the apparatus, the telephone numbers of the receiving ends, the time information, the operational procedure, and so on. More specifically, the display section 104 includes a liquid crystal display (LCD) for displaying communication statuses and various messages, such as register, set and check data, and also includes various light emitting diodes (LED), such as a lamp which blinks to indicate that communication is under way and a lamp which blinks to indicate various errors, a lamp indicating a reading mode, a transmitting mode, etc.

The communication section 105 used for connecting a communication line and communication equipment, such as a telephone, etc., with the facsimile machine 1, performs modulation and demodulation of image communication data input from the communication line, detection of significant signals, and switching of communication channels.

The communication section 105, having connecting units, such as a digital service unit (DSU) and a network control unit (NCU), is connected to communication networks, such as an integrated services digital network (ISDN), a public switched telephone network (PSTN) and so on, through the above units, whereby communication controls, such as calling, receiving, etc., are exercised. Accordingly, the controller 100 transmits the image data coded in the controller 100 to a receiving end and sends the image data received from the receiving end to the controller 100. Modulation and demodulation of the image data and transmitting and receiving of communication procedure signals and dual-tone multiple-frequency (DTMF) signals are performed through a modulator/demodulator (modem). The controller 100 further comprises a buffer for temporarily storing the image data.

The sound system 106 is used to notify the operator of various situations through sound. More specifically, the sound system 106 is formed of speakers that issue sounds indicating error statuses, the end of operation, and instructing the operator to perform an operation.

The external interface 107 is used for linking between the controller 100 and an external unit in order to transmit and receive data therebetween. For example, an interface, such as RS232C, Small Computer System Interface (SCSI), or the like, and a local area network (LAN) can be used to connect the controller 100 with an external unit, such as a personal computer. Instructed by the external computer, the controller 100 is able to control the facsimile machine 1, and more specifically, the controller 100 causes the reading section 101 to read a document image and captures the image data into the computer, whereby transmitting and printing can be performed. The controller 100 is also capable of capturing the data received from a receiving end into the computer. Further, the data output from the computer may be recorded on a recording material in the recording section 102, and the facsimile machine 1 may be employed as a printer for the computer.

The non-volatile storage 108 is a large-capacity nonvolatile memory used for storing image information and the like, and is formed of a recording medium, such as a hard disk, an optical disk, etc. and a drive unit for the medium. The information stored in this storage 108 is not erased even when power is cut off, and it is erased only when an instruction is given to do so.

The controller 100, which controls various types of mechanisms in the above-described elements and performs image processing, can be linked to the respective elements through an interface. The controller 100 is comprised of a microprocessor unit (MPU) for controlling the overall facsimile machine 1, a read only memory (ROM) for storing programs, such as a group of instructions for the operation of the MPU, a random access memory (RAM) used as a work area for processing various types of data, an image RAM used as a temporary storage for image information, an image processing section for performing various types of image processing, such as image scaling, resolution conversion, etc, a coder for coding image data, a decoder for decoding the image data, and first and second coder/encoder (CODEC) having the built-in RAM used as a work area. The provision of the two CODECs makes it possible to perform dual and high-speed operations. The controller 100 is also provided with a calendar, a watch and other functions, and the RAMs are protected from inadvertent accidents, such as a power failure, thanks to battery backup.

Figure 5:
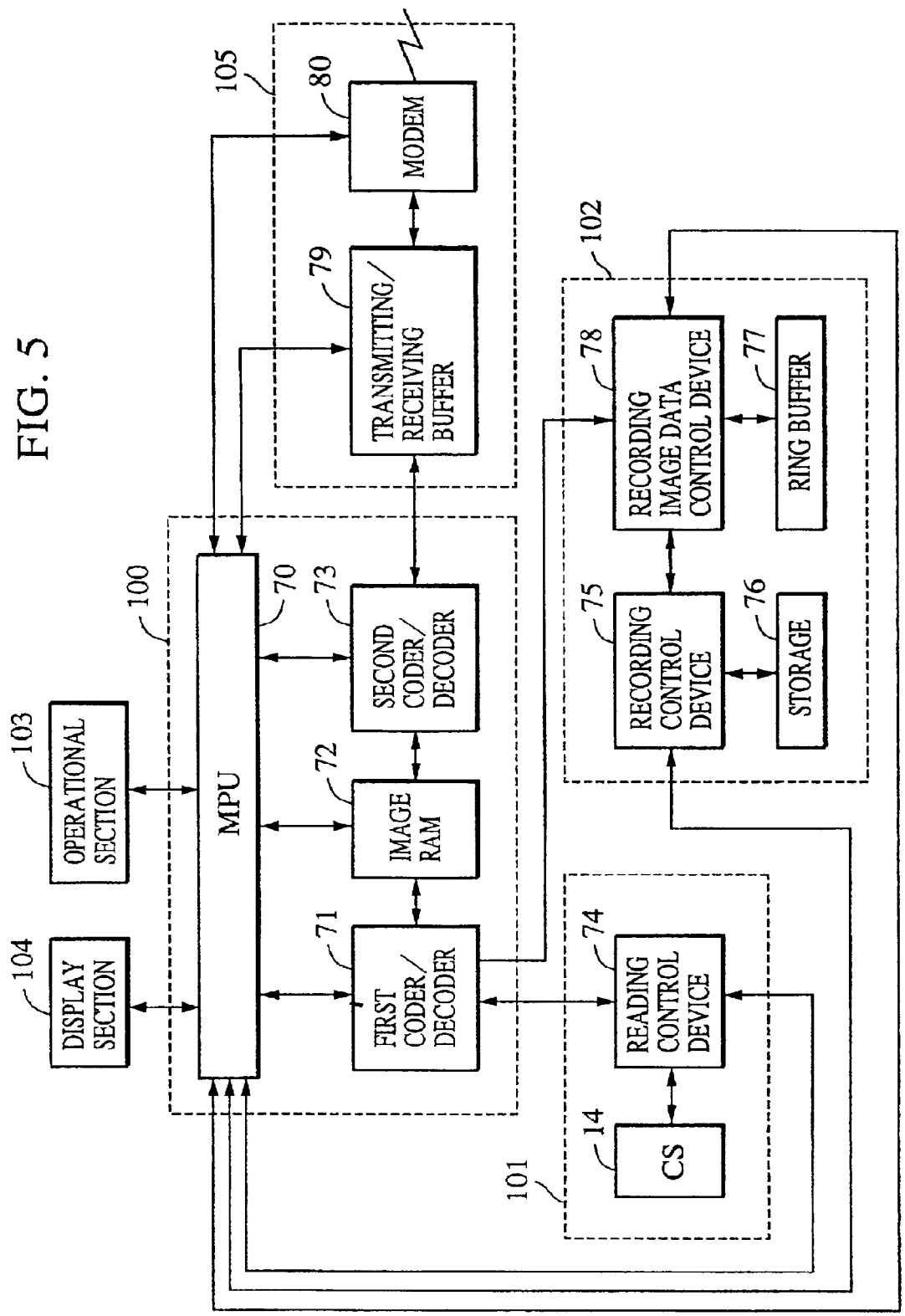
FIG. 5 is a block diagram of the detailed construction of the facsimile machine.

An explanation will now be given of the operation of the facsimile machine 1 with reference to FIG. 5 illustrating the essential portion of the facsimile machine 1 in more detail. A reading control device 74, controlling the various operations of the reading section 101, inputs and outputs signals for exerting reading control over the contact image sensor 14 and the like while interfacing with the MPU 70 for controlling the overall facsimile machine 1. The reading device 74 has a ROM storing various instructions for exercising reading controls, reading means for reading the instructions from the ROM, processing means for processing the read instructions, a RAM through which the information required for the processing means can be input, output means for outputting the signals generated by a processing circuit, and so on. Control is exercised by the interaction of these means.

On the other hand, the recording control device 75, controlling various operations of the recording section 102, inputs and outputs signals for exerting recording control over a storage 76, as well as other sections of the facsimile machine 1 such as the optical section 4, the image-forming section 5, the recording-material feeding section 6, the image-fixing section 7 and so on, while interfacing with the MPU 70. The recording device 75 has a ROM storing various instructions for exercising recording controls, reading means for reading the instructions from the ROM, processing means for processing the read instructions, a RAM through which the information required for the processing means can be input, output means for outputting the signals generated by the processing circuit, and so on. Control is exercised by the interaction of these means.

A ring buffer 77 is formed of a plurality of line buffers. A recording image-data control device 78 transfers the decoded image data to the ring buffer 77, and control is exercised in such a manner that recording is performed when the ring buffer 77 is filled with the data.

Figures 6, 6A:
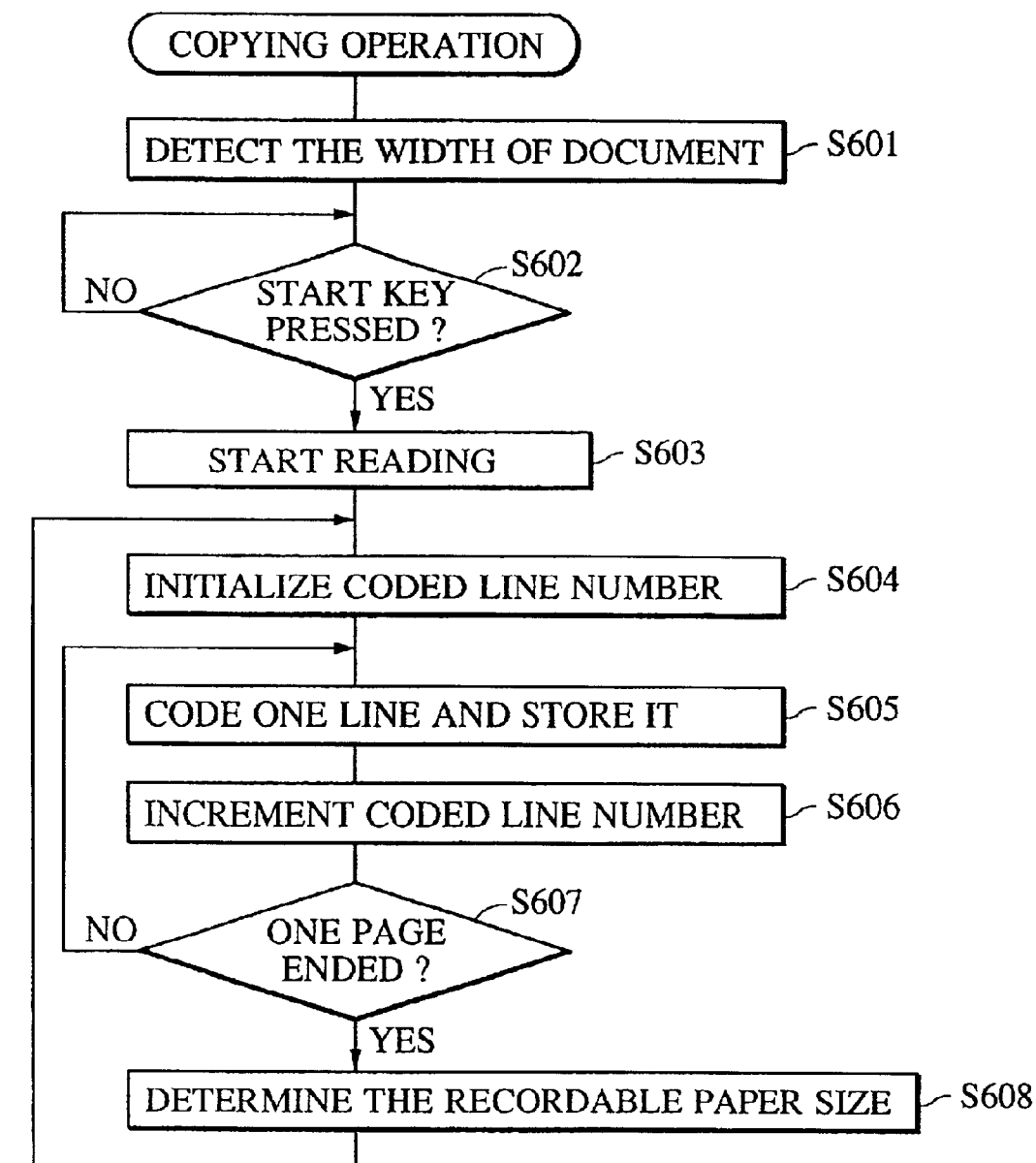
FIG. 6 is a flow chart illustrating the process of the copying operation.
Figure 6B:
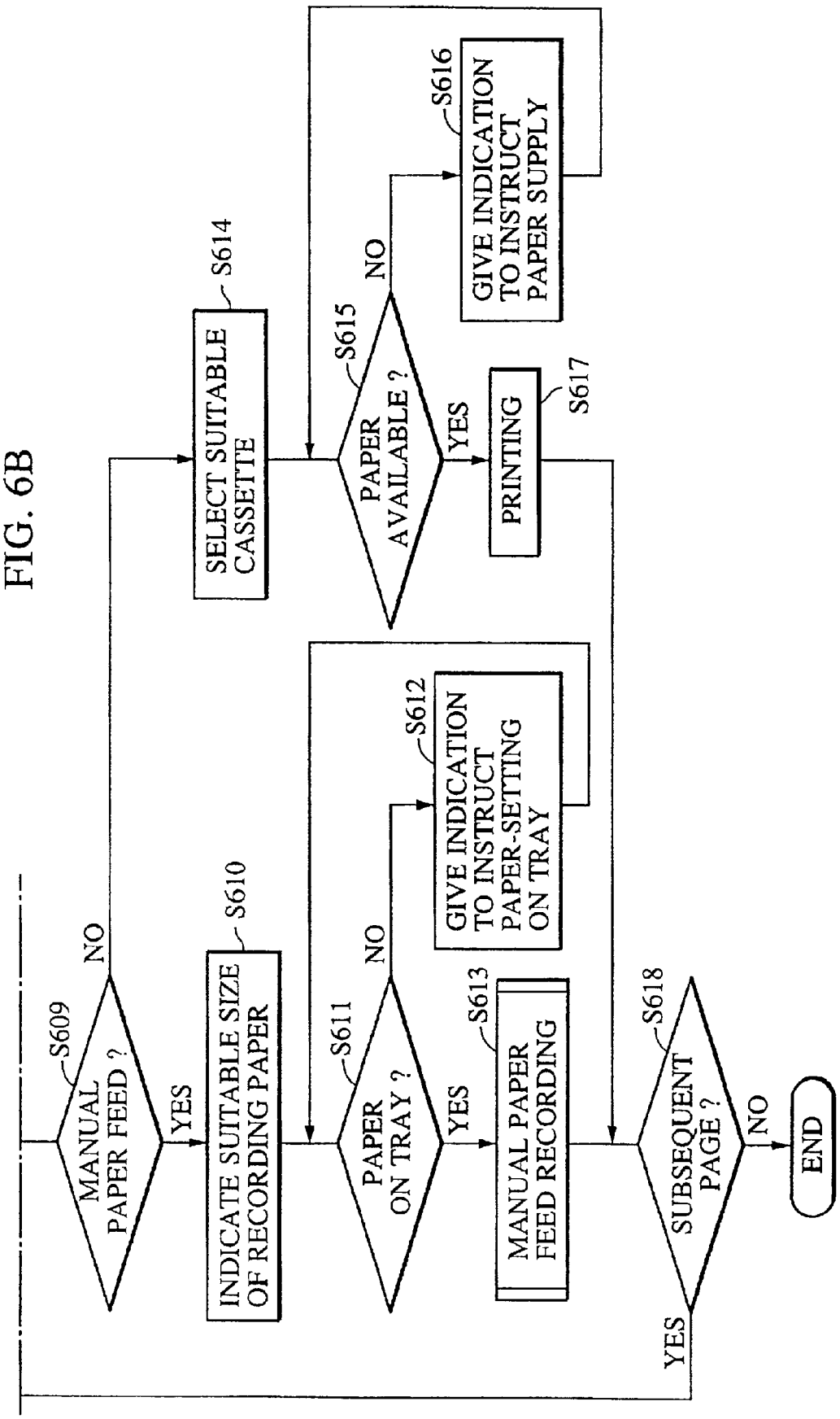

According to the facsimile machine 1 constructed as described above, an explanation will now be given of the processing of the copying operation by an instruction from the MPU 70 with reference to the flow chart of FIG. 6. For simplifying (sharing) the control process, the facsimile machine 1 of this embodiment stores a document image in the reading image RAM 72 in a similar process for either a copying or transmitting operation.

In S601, the width of the document S placed on the document placing table 12 is first detected by the slider 60 and is stored in the RAM within the controller 100. It is then determined in S602 whether the copying start key has been pressed. If the answer in S602 is yes, an instruction is given to the reading control device 74 to start reading the image formed on the document S according to the main-scanning length obtained by the detected document width. In S603, the document S is fed to be read by the contact image sensor 14 with predetermined resolution. The image data is digitized at a suitable level and subjected to image processing and binary processing by the reading control device 74, and is transferred to the controller 100.

In S604, the coded line number of the image data stored in the RAM of the controller 100 is counted, and the counter is then initialized. In S605, the binary data for one line output from the reading control device 74 is coded by the first CODEC 71 according to a predetermined method, such as the modified Huffman (MH) coding scheme or the modified READ (MR) coding scheme, and is stored in the image RAM 72. In S606, the first CODEC 71 notifies the MPU 70 to increment the line number of the image data coded, and the MPU 70 increments the count number of the counter for counting the line number of the image data. The above-described coding operation and line-number counting are continued until the reading control device 74 detects whether the image reading of the document S for one page has been completed in S607. If the answer in S607 is yes, the flow proceeds to S608 in which the size of a recording material on which the read image can be recorded is determined. More specifically, the main-scanning length is obtained by the document width detected in S601, while the sub-scanning length is obtained by the resolution and the line number for one page, whereby the size of a recording material nearest as possible to the size of the read image is determined.

Subsequently, a query is made in S609 as to whether the manual-feeding operation is to be performed. The answer in S609 is yes if the manual-feeding tray 61 is opened, and the flow proceeds to S610 in which the suitable size of a recording material is indicated. It is then determined in S611 whether a recording material is set on the manual-feeding tray 61. If the answer in S611 is yes, the recording material is fed to print the image thereon and is discharged in S613 (described in more detail later). If a recording material is not found to be set on the tray 61 in S611, an indication is provided on the display section 104 to instruct that recording material be set on the tray 61. On the other hand, if it is judged in S609 that the manual feeding is not to be performed, i.e., if the tray 61 is closed, the flow proceeds to S614, in which the cassette for accommodating the recording materials with the suitable size determined in S608 is selected. If a determination is made in S615 that a recording material is available in the selected cassette, the image is printed on the recording material in S617. If a recording material is not available in S615, an indication is given on the display section 104 to instruct the supply of recording materials to the cassette in S616. The foregoing processing is executed on all the documents set on the document placing table 12. When all the documents are correctly copied, the read image data is erased from the image RAM 72. The processing is thus ended.

Figure 8:
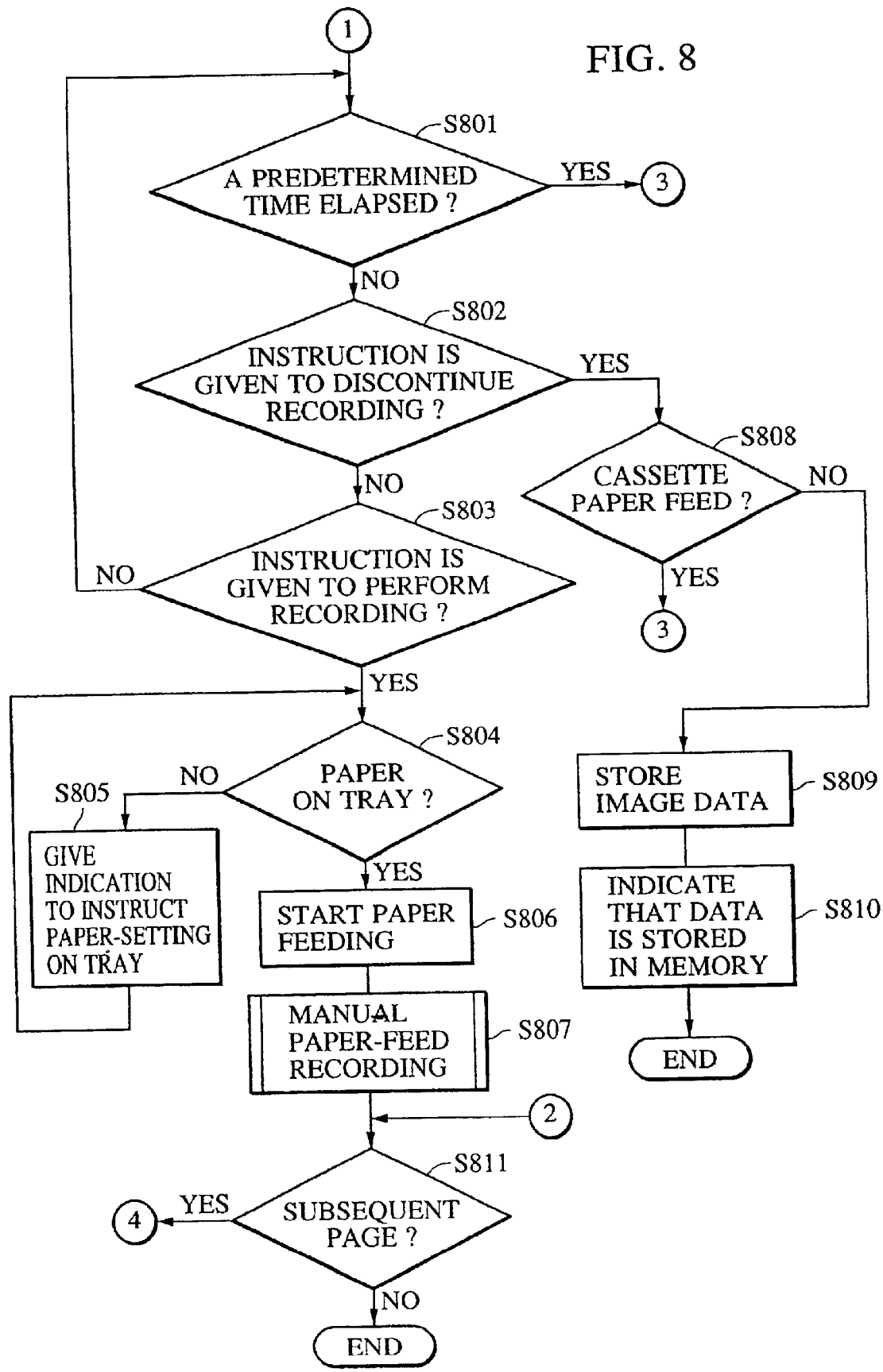
FIG. 8 is a flow chart illustrating the process of the receiving operation.

A description will now be given with reference to the flow charts of FIGS. 7 and 8 of the processing of storing the image data received through facsimile communication in the image RAM 72 and printing it by the recording section 102 based on an instruction from the MPU 70. In S701, incoming-call exists, and a signal input through a communication line is input into a modem 80 of the communication section 105. A procedure signal in the facsimile communication is transmitted and received. In S702, the resolution of the image data and the document width represented by a digital command signal (DCS) are detected, and are stored in the RAM within the controller 100. The counter for counting the coded line-number of the image data stored in the RAM within the controller 100 is then initialized in S703. Subsequently, in S704, the image data is received, and the MPU 70 stores the image data input into the modem 80 in a transmitting/receiving buffer 79 according to an input interrupt signal from the modem 80. The MPU 70 further supplies the coded data stored in the buffer 79 to the second CODEC 73. The second CODEC 73 decodes the coded data in its decoder and stores the decoded data for one line in its built-in RAM. In S705, the decoded data within the RAM is then coded in the coder of the second CODEC 73 with the use of an MR code together with a non-compressed code. The coded data is transferred to the image RAM 72 and stored therein by the MPU 70. In S706, the second CODEC 73 instructs the MPU 70 to increment the coded line number, and the MPU 70 thus increments the number of the counter for counting the line number of the image data. In S707, the coding operation and the line number counting are continued until a return to control (RTC) signal indicating the end of one page of the image data is detected. When the above operations are completed for one page, the flow proceeds to S708 in which the size of a recording material that can contain the received image is determined. More specifically, the main-scanning length is obtained by the document width.(read in at S702), while the sub-scanning length is determined by the resolution of the image data (read in at S702) and the line number for one page, whereby the size of a recording material nearest as possible to the size of the read image can be determined.

It is then determined in S709 whether the manual-feeding operation is to be performed. The answer in S709 is yes if the manual-feeding tray 61 is opened, and the flow proceeds to S710 in which the suitable size of a recording material determined in S709 is indicated. In S711, an alarm sound is issued by the sound system 106, and an indication is provided in S712 to ask for an instruction as to whether the recording operation of the data received through facsimile communication should be performed by manual feeding or discontinued. On the other hand, if a determination is made in S709 that the manual-feeding operation will not be performed, i.e., if the manual-feeding tray 61 is closed, the flow proceeds to S713 in which the cassette for accommodating recording materials with the suitable size is selected. If it is judged in S714 that the recording materials are available, the image is printed on the recording material in S715. If the recording materials are not available in S714, the image data is transferred to the non-volatile storage 108 from the image RAM 72 and stored therein. In S717, an LED of the display section 104 is lit to indicate that the received image data is stored in the storage 108. Subsequently, recording material is set in the cassette and the start key of the operational section 103 is pressed while the LED is lit, the received data is printed on the recording material, and if it is correctly output, the image data is erased from the non-volatile storage 108.

In response to a query made in S712, it is determined in S802 whether an instruction has been given to discontinue the recording operation. If the answer in S802 is no, it is further determined in S803 whether an instruction has been given to perform the recording operation. If no instruction has been given within a predetermined period in S801, the flow returns to S713 to proceed with the printing of an image on the recording material through cassette feeding. If an instruction has been given to perform the recording operation in S803, an inquiry is made in S804 as to whether a recording material is set on the tray 61. If the answer is yes, the recording material is started to be fed in S806 in response to an instruction to perform the recording operation through manual feeding, and the image is printed on the recording material by the manual feeding operation and discharged in S807. If there is no recording material set on the tray in S804, an indication is provided on the display section 104 to give an instruction to set a recording material on the tray 61.

On the other hand, if an instruction has been provided in S802 to discontinue the image-recording operation through manual feeding, the flow proceeds to S808 in which a query is made as to whether an instruction has been given to perform image recording through the cassette feeding. If the answer is yes, the flow returns to S713 to proceed with recording the image on the recording material through cassette feeding. If the answer in S808 is no, the flow proceeds to S809 in which the image data is transferred to the non-volatile storage 108 from the image RAM 72 and stored therein. Then, an LED of the display section 104 is lit to indicate that the image data received in S810 is stored in the storage 108. Upon pressing the start key, the image data is printed on the recording material through manual feeding or cassette feeding. The foregoing processing is executed on all the items of received data. When the data is completely and correctly stored, the image data is erased from the image RAM 72 and the non-volatile storage 108. The process is then completed.

Figure 9:
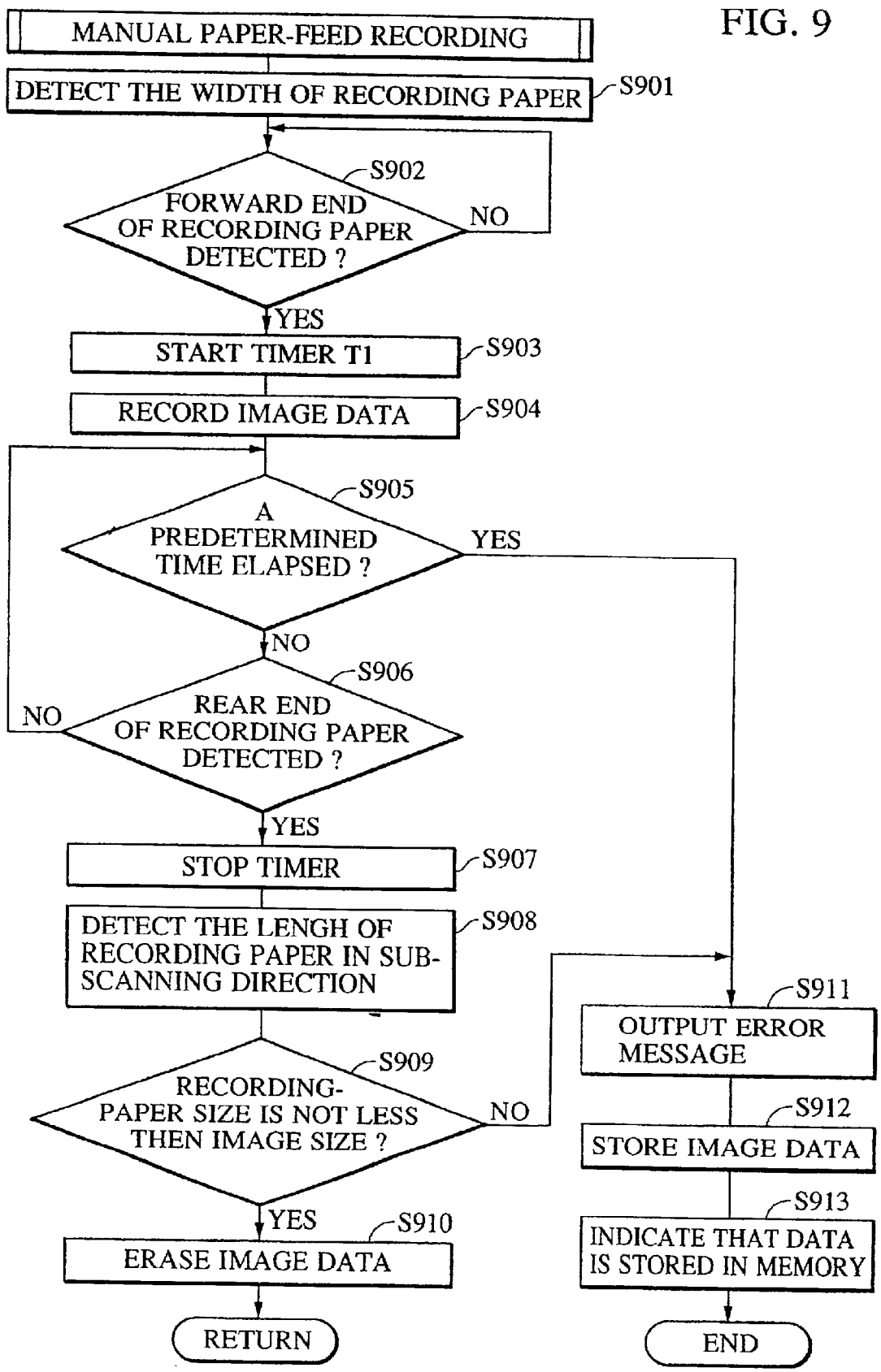
FIG. 9 is a flow chart illustrating the process of the manual-feeding operation.

An explanation will further be given with reference to the flow chart of FIG. 9 of the processing of recording an image on a recording material through manual feeding performed in S613 or S807, under control of the MPU 70 and the recording control device 75.

The size of the recording material that can fit the image data to be recorded (the "recordable image size") determined in S608 or S708 is transferred to the recording control device 75 from the RAM within the controller 100 according to the following method. If a recording material is set on the manual-feeding tray 61, the MPU 70 transmits 6-bit data representing the recordable image size as a command to the recording control device 75. This is performed by serial transmission according to the following operation. The MPU 70 first adds "1" as the most significant bit and a parity bit as the least significant bit to the 6-bit data so as to form 8-bit data, which is then serially transmitted to the recording control device 75 in synchronization with the clock signal. The time chart of the serial transmission is shown in FIG. 10. The MPU 70 transmits BUSY 1 signal to the recording control device 75 before performing serial transmission. The recording control device 75 receives the BUSY 1 signal in an interrupt port, and immediately receives the 8-bit shift data transmitted from the MPU 70 in synchronization with the rising edge of the shift clock signal transmitted from the MPU 70. The 8-bit shift data is further stored in a serial data register (SDR) and transferred to the RAM within the recording control device 75. In this manner, the recording control device 75 receives data representing the recordable image size from the MPU 70 and then stores it in the RAM within the recording control device 75 as information for determining recording errors.

When the MPU 70 is triggered to start manual feed recording as in S613 or S807, it commences to make preparations for transmitting image data to the recording control device 75, as shown in FIG. 9. In S901, the width of the recording material set on the manual-feeding tray 61 is detected by the guide, and the data indicating the width is stored in the RAM within the recording control device 75. Triggered by the recording start as described above, the data stored in the image RAM 72 is once again decoded by the first CODEC 71 and is transferred to the ring buffer 77 including a plurality of line buffers via the recording image data control device 78. The feeding of the recording material is temporarily suspended until the above-described operation is performed. When the ring buffer 77 is filled with the data, the MPU 70 causes the recording control device 75 to initiate the recording operation and to start driving the motor M2. The motor M2 starts to operate to feed the recording materials set on the tray 61 one by one through the feeding roller 31a. Timing is provided by the range sensor 31b to perform recording on the recording material.

The recording material moves an actuator 55 (not shown), which interrupts the optical path of a photointerruptor used as the range sensor 31b, whereby the recording control device 75 detects the forward end of the recording material in S902. At the time the forward end is detected, in S903, the recording control device 75 starts the timer counter T1. When the timer counter T1 reaches a predetermined value, the recording control device 75 outputs the vertical synchronizing signal to the MPU 70. Upon reception of the vertical synchronizing signal, the MPU 70 starts the timer counter T2. When the timer counter T2 reaches a predetermined value, the MPU 70 permits the recording image data control device 78 to receive the horizontal synchronizing signal (beam detection signal) generated in the recording control device 75 by applying a laser beam to the fixed mirror 46 located in the laser optical path. Simultaneously, the timer counter T2 is paused and reset. The recording image data control device 78 transmits binary data for one line from a line buffer of the ring buffer 77 according to the horizontal synchronizing signal input from the recording control device 75 at regular intervals.

The recording control device 75 turns on or off of the laser diode 17 according to the binary data for one line sent from the line buffer located within the ring buffer 77. Concurrently, the device 75 operates the image-forming section 5 to form a toner image on the photosensitive drum 21. The toner image on the photosensitive drum 21 is then transferred to the recording material and fixed thereon in S904. Timing is provided to transmit the vertical synchronizing signal so that the toner image formed on the photosensitive drum 21 can be started to be transferred to a desired position of the recording material during the rotation of the photosensitive drum 21. The recording material with the image thereon is further fed. When the actuator 55 returns to the home position after the rear end of the recording material passes through the actuator 55, it releases the optical path of the photointerruptor used as the range sensor 31b. This enables the recording control device 75 to detect the rear end of the recording material in S906.

If it is determined in S905 that the timer counter T1 exceeds a below-described predetermined range W2, it is judged that jamming of the recording material has occurred, and the flow proceeds to S911. If the timer counter T1 does not exceed W2 prior to detection of the rear end of the recording material in S906, the recording control device 75 stops the timer counter T1 in S907.

The length of the recording material in the sub-scanning direction is detected based on the value of the counter T1 in S908. While these operations are performed, care should be taken to consider data concerning variations in the feeding speed of the recording material and the maximum size of the material that may be used as described below. The recording control device 75 determines in S909, based on the recordable size obtained by the MPU 70, whether the size of the recording material is not smaller than the size of the image data, i.e., whether the image data can be contained within the recording material. This determination is made by comparing the data on the recordable size obtained based on the size of the image data informed by the MPU 70 with the data about the size of the recording material based on the results detected in S901 and S908. More specifically, it is determined whether the width of the recording material is not smaller than the width of the image data in the main scanning direction, and it is determined whether the value of the timer counter T1 is within the range W2 which is defined by a buffer period or allowance W1 before and after the below-described time T3 in the sub-scanning direction. The time T3 represents the period required for a recording material having an adequate length in the sub-scanning direction acquired based on the resolution of the image data and the line number to pass through the position of the actuator 55. The allowance W1 is provided for the data concerning variations in the feeding speed and the maximum size of the recording material that may be used.

If the value of the timer counter T1 is not within the above-described range W2, or if the width of the recording material is smaller than the width of the image data, the recording control device 75 determines that a recording error has occurred and adds an error message to the recording material in S911. That is, if the width of the recording material is 40 smaller than the width of the image data, or if the value of the timer counter T1 is smaller than the range W2, it can be determined that the image data partially lies off the recording material. Accordingly, the message indicating this error is added to the image and is output. On the other hand, if the value of the timer counter T1 exceeds the range W2, jamming of the recording material has occurred, and an error report representing this error message is output after the recording section 102 is recovered. An indication of the error is also given on the display section 104.

In S912, the image data is transferred from the image RAM 72 to the non-volatile storage 108 and stored therein. Also, in S913, an LED of the display section 104 is lit to indicate that the received image data is stored in the storage 108. The apparatus can thus be in the standby position to wait for output processing instructions from the operator. The error report provided in S911 includes the year, month, date, hour and minute when the data was received, and also indicates that the data is stored in the storage. If a judgement is made in S909 that the recording operation has been correctly performed, the flow proceeds to S910 in which the image is erased from the image RAM 72 within the MPU 70.

As will be clearly understood from the foregoing description, the present invention offers the following advantages.

When data is received through facsimile transmission, the size of a recording material to be used through manual feeding is indicated based on the size of the received data. The operator is thus able to set on the manual-feeding tray 61 a recording material of the suitable size, thereby preventing recording errors. Further, an indication is given to ask for an instruction as to whether the recording operation is to be performed or discontinued, and based on this instruction, the recording material can be reset, thereby avoiding the inadvertent start of the recording operation. At the same time, an alarm sound is issued to raise the operator's attention. Moreover, the cassette feeding is selected if there has been no instruction after a lapse of time. This makes it possible to record the received data even though the operator is away from the facsimile machine, leaving the manual-feeding tray open, thereby preventing the memory from becoming full. Also, if a recording error occurs during manual feeding, the input image data is stored in the memory and can be read from the memory afterwards without requiring the re-inputting operation. A determination of the recording error is made by the size of the input image data, the width of the recording material, and the data representing the period from when the forward end of the recording material reaches the range sensor until when the rear end passes therethrough. The sensor and the timer used for the above-mentioned time counting can be shared with the conventional sensor and timer for detecting jamming, thereby avoiding an increase in size and costs. Additionally, if the image data has been fit the recording material, it is erased from the memory, thus enhancing the effective use of the memory. Any error can be recovered promptly by adding an error message and outputting an error report.

Given by the above advantages, it is possible to make easy communications of image data of arbitrary sizes through manual feeding. In the copying operation, the size of the recording material to be used is indicated, and if the recording material is set, the document image is started to be copied without requiring an instruction as to whether the recording operation will be performed or discontinued.

The above-described embodiment has been explained in which a recording operation is performed when data is received through facsimile transmission or when a photocopy is made. When data output from a computer is to be recorded, the modification may be made in such a manner that the size of a recording material to be used may be indicated in a manner similar to the copying operation, and recording is started when the recording material is set.

In the foregoing embodiment, any type of recording materials used for recording images may be used as long as they are sheet-like materials, such as ordinary paper, OHP sheets, postcards, etc. Also, the flow charts of FIGS. 6 to 9 illustrate the flow of the processing controlled by the MPU 70 based on the program stored in the ROM within the controller 100. However, the information representing this program may be stored in an unlodable storage medium, such as a magneto-optic disk or the like, whereby the information is applicable to another apparatus that can analyze it.

The individual components designated by blocks in the Drawings are all well-known in the image forming apparatus arts, and their specific construction and operation are not critical to the operation of or best mode for carrying out the invention.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-processing apparatus comprising:
   an input unit for inputting image data;
   a printer which prints an image on a recording material based on the image data input by said input unit;
   an accommodating unit for accommodating preloaded recording material;
   a manual-feeding unit for feeding the recording material;
   a size-detection unit for detecting, as feeding of the recording material begins, a size of the image data input by said input unit;
   a determining unit for determining, based on the size of the image data detected by said size-detection unit, a recording-material size appropriate for recording the image data input by said input unit;
   a display for displaying, when feeding is to be performed by said manual-feeding unit, the recording-material size determined by said determining unit;
   a memory which stores the image data input by said input unit, and
   a controller which controls said memory so as to hold the image data after completion of a printing operation in a case where said printer prints the image onto the recording medium fed by said manual feeding unit.

2. An image processing apparatus according to claim 1, wherein said input unit inputs the image data received through a communications network.

3. A control method for an image-processing apparatus, comprising the steps of:
   (a) inputting image data;
   (b) detecting a size of the image data input in step (a) as feeding of a recording material begins;
   (c) determining a recording-material size appropriate for recording the image data input in step (a) based on the size of the image data detected in step (b); and
   (d) displaying the recording-material size determined in step (c) before the start of recording when the recording is to be done on recording material fed from an accommodating unit accommodating preloaded recording material by a manual-feeding mechanism for use with said image-processing apparatus;
   (e) storing in memory the input image data;
   (f) printing an image on the manually fed recording material in a printing operation; and
   (g) controlling the memory so as to hold the input image data after the printing operation in a case where said printer prints the image onto the recording medium by said manual feeding unit.

4. A machine-readable medium on which is stored a program for effecting the steps of:
   (a) inputting image data;
   (b) detecting a size of the image data input in step (a) as feeding of a recording material begins;
   (c) determining a recording-material size appropriate for recording the image data input in step (a) based on the size of the image data detected in step (b); and
   (d) displaying the recording-material size determined in step (c) before the start of recording when the recording is to be done on recording material fed from an accommodating unit accommodating preloaded recording material by a manual-feeding mechanism for use with said image-processing apparatus;
   (e) storing in memory the input image data;
   (f) printing an image on the manually fed recording material in a printing operation; and
   (g) controlling the memory so as to hold the input image data after the printing operation in a case where said printer prints the image onto the recording medium fed by said manual feeding unit.

5. An image processing apparatus comprising:
   an input unit which inputs image data;
   a printer which prints an image based on the image data input by said input unit on a recording material;
   an accommodating unit for accommodating preloaded recording material;
   a manual-feeding unit which feeds the recording material;
   a memory which stores the image data input by said input unit, and
   a controller which controls said memory so as to hold the image data after performance of a printing operation in a case where said printer prints the image onto recording medium fed by said manual feeding unit.

6. An image processing apparatus according to claim 5, wherein said input unit inputs the image data received through a communication network.

7. An image processing apparatus according to claim 5, wherein said manual-feeding unit cannot detect a size of the recording material only with its loading.

8. An image processing apparatus according to claim 5, further comprising a determining unit which determines whether the image based on the image data input by said input means is fully printed on the recording material fed by said manual-feeding unit, wherein said controller erases the image data stored in said memory in a case where said determining unit determines that the image is fully printed.

9. An image processing apparatus according to claim 5, further comprising an accommodate unit which accommodates a recording material in which its size is specified, wherein said controller erases the image data stored in said memory in a case where the printing operation is performed on a recording material supplied from said accommodate unit is performed.

10. A control method for an image-processing apparatus, comprising the steps of;
    inputting image data;
    manually feeding a recording material from an accommodating unit accommodating preloaded recording material;
    storing the image data input in a memory;
    printing an image on the recording material based on the image data input; and
    controlling the memory so as to hold the image data after a printing operation in a case where said printer prints the image onto the recording medium fed by said manual feeding unit.

11. A machine readable medium on which is stored a computer program for performing the steps of:
    inputting image data;
    manually feeding a recording material from an accommodating unit accommodating preloaded recording material;
    storing the image data input in a memory;
    printing an image on the recording material based on the image data input; and
    controlling the memory so as to hold the image data after a printing operation in a case where said printer prints the image onto the recording medium fed by said manual feeding unit.

* * * * *

UNITED STATES PATENT AND TRADEMARK OFFICE
CERTIFICATE OF CORRECTION

PATENT NO. : 7,133,147 B2
APPLICATION NO. : 09/859481
DATED : November 7, 2006
INVENTOR(S) : Yasuo Komada It is certified that error appears in the above-identified patent and that said Letters Patent is hereby corrected as shown below:

COLUMN 10:
Line 52, "width. (read" should read --width (read--.

COLUMN 12:
Line 53, "of" should be deleted.

COLUMN 13:
Line 42, "is 40" should read --is--.

COLUMN 14:
Line 25, "fit" should read --fit to--.
Line 29, "by" should be deleted.

COLUMN 16:
Line 32, "accommodate" should read --accommodating--.
Line 36, "accommodate" should read --accommodating--.

Signed and Sealed this

Eighth Day of May, 2007

JON W. DUDAS
*Director of the United States Patent and Trademark Office*